United States Patent [19]

Swanstrom et al.

[11] Patent Number: 5,668,977
[45] Date of Patent: Sep. 16, 1997

[54] DOCKABLE COMPUTER SYSTEM CAPABLE OF ELECTRIC AND ELECTROMAGNETIC COMMUNICATION

[75] Inventors: Scott Swanstrom, Cedar Park; Douglas D. Gephardt, Austin, both of Tex.

[73] Assignee: Advanced Micro Devices, Inc., Austin, Tex.

[21] Appl. No.: 642,188

[22] Filed: May 6, 1996

Related U.S. Application Data

[63] Continuation of Ser. No. 217,952, Mar. 25, 1994, abandoned.

[51] Int. Cl.⁶ .......................... G06F 13/00; G06F 15/177
[52] U.S. Cl. .................. 395/500; 364/240.8; 364/260.1; 364/280.2; 364/284; 364/DIG. 1
[58] Field of Search ........................ 395/500, 800, 395/309, 200, 700

[56] References Cited

U.S. PATENT DOCUMENTS

| | | |
|---|---|---|
| 4,530,069 | 7/1985 | Desrochers . |
| 4,769,764 | 9/1988 | Levanon . |
| 4,903,222 | 2/1990 | Carter et al. ........................ 364/708 |
| 4,969,830 | 11/1990 | Daly et al. . |
| 5,003,472 | 3/1991 | Perrill et al. ........................ 364/401 |
| 5,030,128 | 7/1991 | Herron et al. . |
| 5,052,943 | 10/1991 | Davis . |
| 5,126,954 | 6/1992 | Morita . |
| 5,175,671 | 12/1992 | Sasaki . |
| 5,187,645 | 2/1993 | Spalding et al. . |
| 5,195,183 | 3/1993 | Miller et al. . |
| 5,241,542 | 8/1993 | Natarajan et al. . |
| 5,265,238 | 11/1993 | Canova, Jr. et al. ........................ 395/500 |
| 5,367,452 | 11/1994 | Gallery et al. ........................ 364/401 |
| 5,386,567 | 1/1995 | Lien et al. ........................ 395/700 |
| 5,414,817 | 5/1995 | Ezzet et al. ........................ 395/275 |

OTHER PUBLICATIONS

HPSIR, "Special Infrared Comm. Specification" Introduction, pp. 1–9, Jul. 1993.

Primary Examiner—Kevin J. Teska
Assistant Examiner—Ayni Mohamed
Attorney, Agent, or Firm—Foley & Lardner

[57] ABSTRACT

A dockable computer system includes a portable computer (notebook or laptop) and a docking station (base unit). The portable computer and docking station both include a communication system so that messages can be communicated when the docking station is in an undocked state preparatory to a docked state. The communication system is preferably an infrared communication system. A communication protocol is also provided for generating an advance notice signal to warn of an impending dock. The communication protocol includes a CONNECT message, a CONNECT DETECTED message, and a CONFIRM message. Preferably, the CONNECT message is sent at a non-standard AT/PC baud rate. The communication system allows the dockable computer system to advantageously generate an advance notice signal of an impending dock and to transfer parameters necessary for the employment of sophisticated protective measures which protect the active buses of the portable computer and docking station during a docking event. Preferably, the portable computer performs an interrupt subroutine in response to receiving the CONNECT message. The notice signal is generated as part of the interrupt subroutine.

23 Claims, 5 Drawing Sheets

DOCKABLE COMPUTER SYSTEM CAPABLE OF ELECTRIC AND ELECTROMAGNETIC COMMUNICATION

This is a continuation of application Ser. No. 08/217,952 filed Mar. 24, 1994 abandoned.

TECHNICAL FIELD

The present invention relates generally to a dockable computer system in which a portable computer unit is associated with a stationary host computer through a station unit, more particularly, to a system and method for implementing such a system in a manner facilitating communication between the portable and station units prior to physical combination.

BACKGROUND OF THE INVENTION

A dockable computer system includes a portable computer, usually a notebook or laptop, and a stationary or base computer unit having a docking station for receiving the portable unit. Dockable computer systems may be operated in a docked state in which both computer units are physically associated as a generally unified system or the remote unit may be separated from its host for independent operation in the undocked state.

Rudimentary docking systems of the foregoing variety have been designed in an effort to meet the needs of today's mobile computer users for "ubiquitous" computing system capabilities, to fulfill their computing needs in diverse aspects of their professional and personal lives and in sundry locations. Contemporary dockable computer systems approach this problem through a single system capable of operating as an expandable desktop computer having a detachable mobile computing unit.

The expandable desktop computer provides greater storage resources, network connectivity, larger displays, and other superior facilities which are necessary for the typical range of generally demanding home and office computing. The portable computer (mobile computer unit) allows the user to have computing capabilities while outside the home or office by detaching that component with its indigenous hardware and resident software. The computing capabilities of the portable computer are somewhat limited due to size, weight and power constraints but represent the best available approach in these embryonic attempts to balance portable mobility needs.

When the user leaves the host environment of home or office, the portable computer is undocked (that is, physically detached) from the docking station of the stationary computer unit. Applications, files, and other data needed for the mobile computing task must have previously been stored in the portable computer. When the user returns to the host environment, the portable computer is reunited with the docking station so that the applications, the files, and other data are stored and maintained in a single location. Thus, the use of a dockable computer system allows the user to have access to any needed applications, files, and other data just before embarking on the mobile computing task.

When the dockable computer system changes states from the undocked state to the docked state (a docking event), protective measures are required to prevent signaling failures, bus crashes, and component damage caused by physically connecting the active buses of the portable computer and the docking station. Contemporary dockable computer systems are "cold docking" systems which protect the buses by powering off the portable computer and docking station. Powering off the portable computer and docking station renders the buses inactive so that the protective measures are not required. These "cold docking" systems are disadvantageous because the user must wait for the dockable computer system to be turned on, rebooted, and reconfigured before the dockable computer system is operational in the docked state.

Further, these contemporary dockable computer systems generally utilize mechanical switches to sense a docking event. Mechanical switches are disadvantageous because they are impractical for transferring information necessary for conveniently docking the portable computer with the docking station. Also, mechanical switches require accurate alignment and are prone to wear. Thus, contemporary docking systems meet only the physical needs of a "ubiquitous" computing system but do not address the convenience and communication needs of the users of such a system.

There is a need for a dockable computer system which includes a communication system for generating an advanced notice signal which warns of a docking event so that the protective measures may be employed. Further, the advance warning signal enables the portable and host computer units to otherwise provide for the docking event by preparing certain applications, files, or other data for immediate access. Also, there is a need for a communication system for transferring parameters necessary for the employment of sophisticated protective measures which allow active buses to be connected. Such a communication system enables a dockable computer system to be conveniently docked and operational in a minimal amount of time. Thus, there is a need for a dockable computer system having a communication link providing advanced warning of an impending docking event.

SUMMARY OF THE INVENTION

The present invention relates to a dockable computer system susceptible of assuming a docked state and an undocked state. The dockable computer system includes a portable computer having a bus and a host station having a bus. The bus of the host station is in operative, perhaps physical, electrical communication with the bus of the portable computer when the dockable computer system is in the docked state. The host station is in electromagnetic communication with the portable computer when the dockable computer system is in the undocked state preparatory to the docked state.

The present invention also relates to a method of communicating data between a portable computer and a host station in a dockable computer system where each unit includes a bus. The method includes the steps of electromagnetically communicating data between the portable computer and the host station when the dockable computer system is in the undocked state preparatory to docking; and electrically communicating the data between the bus of the portable computer and the bus of the host station when the dockable computer system is fully docked.

The present invention advantageously provides advance notification of a docking event utilizing an electromagnetic communication link between a portable computer and its host docking station. The advance notification advantageously enables the dockable computer system to prepare for a docking event.

In one aspect of the present invention, the system preferably provides an infrared communication link between a portable computer and a docking station. In another aspect of the present invention, the system advantageously provides a communication protocol between a portable computer and a docking station in a dockable computer system. In still a further aspect of the present invention, the system advantageously provides a dockable computer system with a communication system capable of transferring parameters necessary for the deployment of sophisticated protective measures which are required when connecting active buses.

BRIEF DESCRIPTION OF THE DRAWINGS

The invention will hereafter be described with reference to the accompanying drawings, wherein like numerals denote like elements, and.

DETAILED DESCRIPTION OF THE PREFERRED EMBODIMENT

Figure 1:
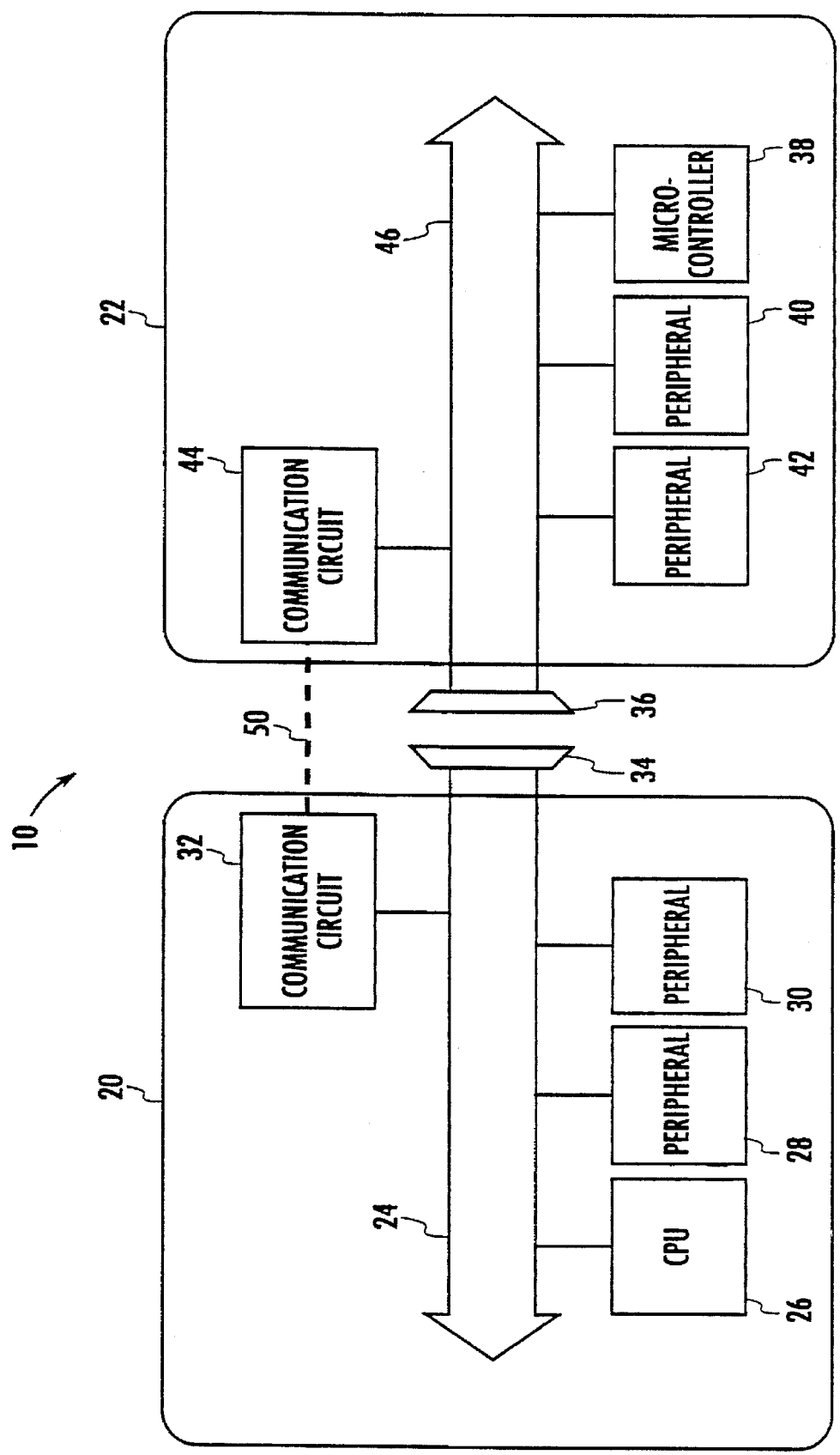
FIG. 1 is a simplified block diagram of a dockable computer system of the present invention.

FIG. 1 shows schematically a dockable computer system 10 including a portable computer 20 and a docking or host station 22. Portable computer 20 is a mobile computer unit including a CPU 26, a system bus 24 and a communication circuit 32. Portable computer 20 can also include a peripheral device 28 and another peripheral device 30. System bus 24 couples CPU 26, peripheral device 28, peripheral device 30 and communication circuit 32. An external connector 34 is also coupled with system bus 24. Bus 24 can be a CPU-to-memory bus, an I/O bus, a standard bus, PCI bus, sub-bus, scan bus, or any type of bus functionally operative in a microcomputer environment.

Docking station 22 includes a communication circuit 44 coupled with a docking bus 46. Docking station 22 can also include a microcontroller 38, a peripheral device 40 and a peripheral device 42. Docking bus 46 couples communication circuit 44, microcontroller 38, peripheral device 40 and peripheral device 42. An external connector 36 is also coupled with docking bus 46. Docking bus 46 can be a CPU-to-memory bus, an I/O bus, a standard bus, PCI bus, sub-bus, span bus, or any type of bus as noted generally above.

Docking station 22 is a host station which can have superior, equal or inferior computing power compared to portable computer 20. For example, microcontroller 38 can be replaced by a more powerful microprocessor as warranted by applications for system 10. It is within the scope of the present invention to utilize a minicomputer as the host system should the user so desire.

When dockable computer system 10 is in an undocked state, external connectors 34 and 36 are not physically coupled. Therefore, in the undocked state, system bus 24 and docking bus 46 are not in physical electrical communication. In the undocked state, portable computer 20 is operable as a stand-alone computer and is physically separate from docking station 22.

When dockable computer system 10 is in a docked state, external connector 34 and external connector 36 are physically coupled. With connectors 34 and 36 coupled, CPU 26 can electrically communicate with components in docking station 22 such as peripheral device 42, peripheral device 40, or microcontroller 38 via system bus 24, connectors 34 and 36, and docking bus 46. In the docked state, docking station 22 receives portable computer 20 so that dockable computer system 10 operates as a single desktop computer or an integrated computer system.

User specified parameters typically define both the docking event of physically and electrically coupling the portable and host units and, therefore, the events in the undocked state preparatory to a docking event. For example, it is customary for many users to operate a laptop or notebook computer at a site remote from a host network system; for instance, a user can tap into a LAN located in his office from home or hotel locations. This is generally true whether the user has a prior art dockable computer and is communicating via phone link to his host unit LAN, or desires to adopt the system approach of the present invention. However, in the prior art approach, though the mobile and stationary units are electrically communicating (via a wire or even wireless link), one would not reasonably consider this configuration to be "preparatory to a docking event" except in the trivial case that any use of such a prior art system in the undocked state is preparatory to docking, eventually. On the other hand, a mobile computing user with his laptop can be physically quite some distance from the host LAN, perhaps in the same building or merely its proximity, but intending to dock the two when able to effect the necessary physical connection. In this sense, therefore, docking and the events preparatory to it are user defined by user intentions manifest in some fashion to signal either or both the mobile and host units that docking is imminent. It is in that sense that the phrase "preparatory to" docking is used herein.

When dockable computer system 10 is in an undocked state preparatory to the docked state, communication circuit 32 and communication circuit 44 are capable of communicating across a communication link 50. When the user intends to dock portable computer 20 with docking station 22, dockable computer system 10 is in the undocked state preparatory to the docked state and must be prepared for the impending docking event. For example, when the user sets portable computer 20 in the proximity of docking station 22 so that portable computer 20 and docking station 22 are capable of communicating across communication link 50 and the user intends to operate dockable computer system 10 as a single desktop computer, dockable computer system 10 is in the undocked state preparatory to the docked state. Alternatively, the undocked state preparatory to the docked state could require that portable computer 20 and docking station 22 are in a line of sight so that communication link 50 can be established.

Electromagnetically communicating in the undocked state preparatory to the docked state should not be confused with a mobile computer unit communicating via a mobile phone link, telephone link, LAN, WAN, or other communication link without an intention of uniting the mobile computer unit with a host station. Preferably, portable computer 20 and docking station 22 are in close physical proximity when dockable computer system 10 is in the undocked state preparatory to the docked state. Though this intermediate state, preparatory to docking, is not universally susceptible to quantification, due to the vagaries of users and uses, one would generally consider this state to precede docking by a time period measured from several seconds to several minutes (e.g. 1–2 seconds to 5–15 minutes), though in some implementations the time could be shorter or longer. For example, if only a small amount of data needs to be communicated across link 50 before docking, the time period can be minimal (less than a fraction of a second).

Preferably, communication circuits 32 and 44 allow system bus 24 and docking bus 46 to be in electromagnetic communication, using convenient portions of the spectrum less susceptible to unfilterable interference and less hostile to human operators. Alternatively, communication link 50 can be a long pin interface such as a serial port comprised of elongated pins and sockets. In this alternative, the long pin interface is configured so portable computer 20 and docking station 22 can be in physical electric communication via the long pin interface before connectors 34 and 36 are electrically coupled.

Preferably, communication link 50 allows portable computer 20 and docking station 22 to communicate messages related to an impending docking event. Such messages include an advance notice or warning signal of the impending dock, as well as predock configuration information such as bus speeds, component identification, voltage interface information, or other parameters. Further, other information such as parameters related to the configuration of peripheral devices 28 and 30 on system bus 24 and peripheral device 40 and 42 on docking bus 46 can be transferred via communication link 50 to advantageously reduce the amount of time required to complete the docking event.

Figure 2:
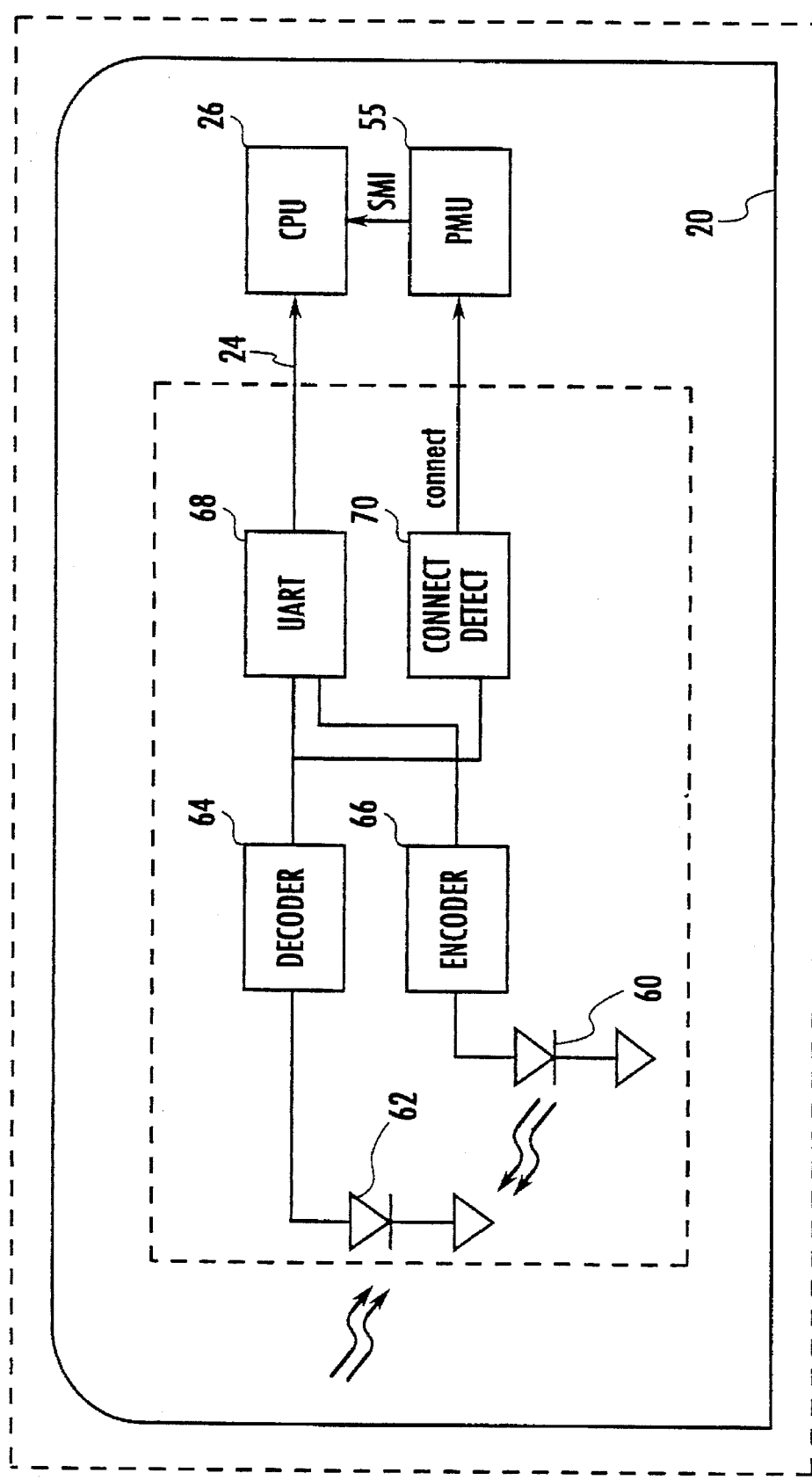
FIG. 2 is a block diagram of a portable computer for use in the dockable computer system illustrated in FIG. 1.

FIG. 2 is a block diagram of the essential components of portable computer 20, including a power management unit (PMU) 55, a CPU 26, a system bus 24 and a communication circuit 32. In this preferred embodiment, communication circuit 32 includes an infrared transmitter 60, an infrared receiver 62, a decoder 64, an encoder 66, a UART 68 and a connect detect logic circuit 70. Infrared receiver 62 is coupled with decoder 64 which, in turn, is coupled with UART 68 and connect detect circuit 70. Encoder 66 is coupled with UART 68 and UART 68 is coupled with system bus 24. Connect detect logic circuit 70 is coupled with power management unit 55. PMU 55 is coupled to CPU 26. Preferably, infrared receiver 62 is a photo-diode, and infrared transmitter 60 is an infrared LED.

Messages transmitted over communication link 50 from docking station 22 to portable computer 20 are received by infrared receiver 62 and decoded by decoder 64. Decoder 64 provides the messages to UART 68 and connect detect logic circuit 70. UART 68 provides the messages to CPU 26 via system bus 24. Connect detect logic circuit 70 provides a connect signal to PMU 55 in response to certain messages provided over communication link 50. Connect detect logic circuit 70 is preferably a microcontroller which runs pattern detection software. PMU 55 provides an interrupt to CPU 26 in response to the connect signal.

CPU 26 provides the messages to be transmitted to UART 68 via system bus 24. UART 68 provides the messages across system bus 24 to CPU 26. UART 68 provides the messages to encoder 66. Encoder 66 encodes the messages and provides them to infrared transmitter 60. Infrared transmitter 60 then transmits the messages across communication link 50.

Figure 3:
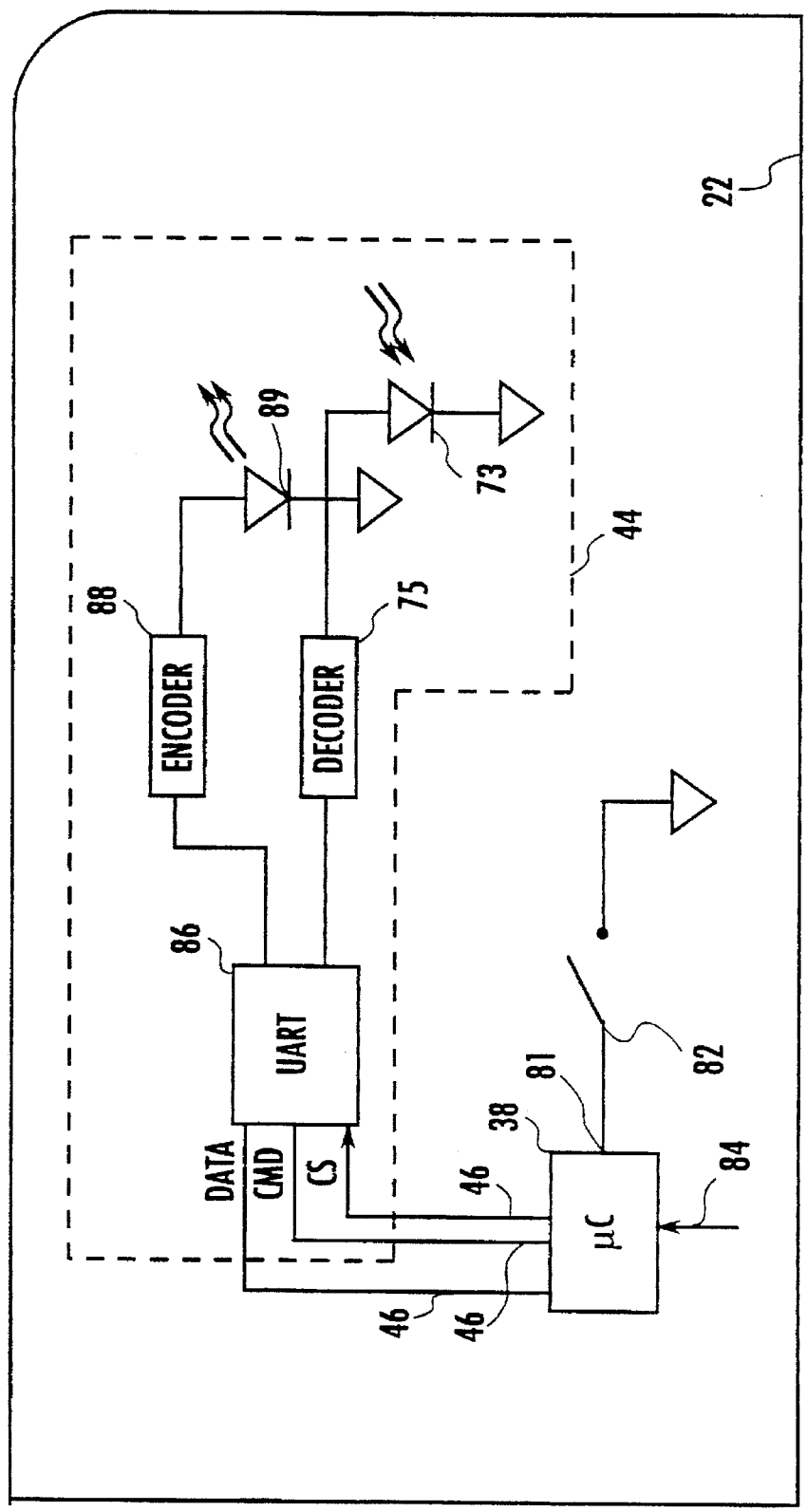
FIG. 3 is a block diagram of a docking station for use in the dockable computer system illustrated in FIG. 1.

FIG. 3 is a block diagram of docking station 22. In this preferred aspect of the present invention, docking station 22 includes communication circuit 44, a microswitch 82, a clock input 84 and microcontroller 38. Microcontroller 38 includes an input 81 for receiving a signal from microswitch 82.

Communication circuit 44 includes a UART 86, an encoder 88, a decoder 75, an infrared transmitter 89 and an infrared receiver 73. Microcontroller 38 is coupled to UART 86 via docking bus 46. UART 86 is coupled to encoder 88 and decoder 75. Encoder 88 is connected to infrared transmitter 89 and decoder 75 is coupled to infrared receiver 73.

Messages transmitted over communication link 50 from portable computer 20 to docking station 22 are received by infrared receiver 73 and decoded by decoder 75. Decoder 75 provides the messages to UART 86. UART 86 provides the messages across docking bus 46 to microcontroller 81.

Microcontroller 38 provides the messages to be transmitted to UART 86 via docking bus 46. UART 86 provides the messages to encoder 66. Encoder 66 encodes the messages and provides the messages to infrared transmitter 89. Infrared transmitter 89 transmits the messages across communication link 50 to portable computer 20.

Microswitch 82 is preferably positioned to be actuated when dockable computer system 10 is in an undocked state preparatory to the docked state. Preferably, when portable computer 20 is about to be docked with docking station 22, the weight of portable computer 20 closes microswitch 82 and provides a signal at input 81 to microcontroller 38. Alternatively, microswitch 82 can be a user-actuated switch, software controlled register or other device for indicating the user's intent (more specifically, the physical manifestation thereof) to dock portable computer 20 with docking station 22.

Figures 4, 5:
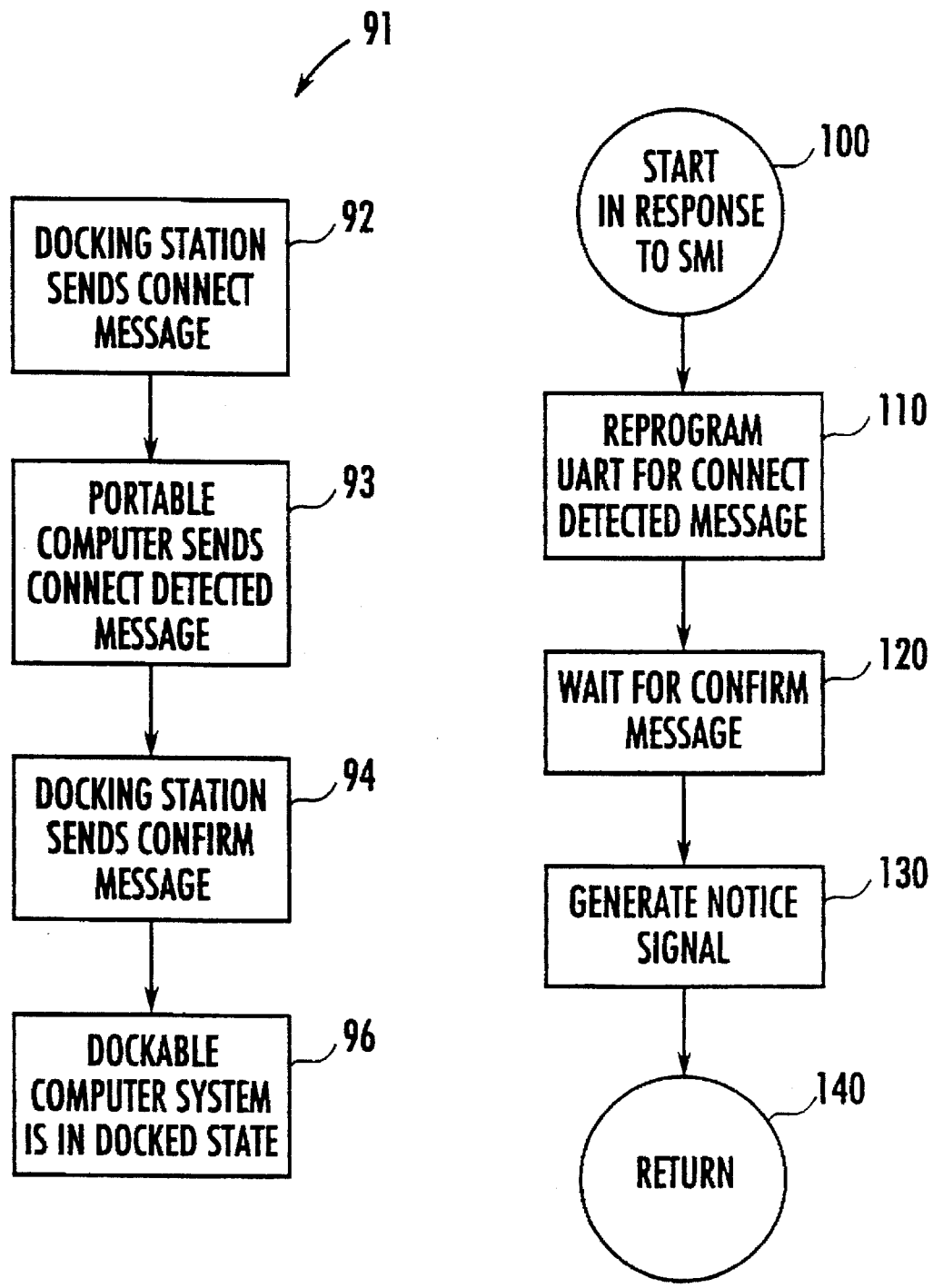
FIG. 4 is a flow chart of a docking event in the dockable computer system illustrated in FIG. 1.
FIG. 5 is a flow chart showing a system management interrupt service routine in accordance with another aspect of the present invention.

FIG. 4 is a flow chart of the operation of dockable computer system 10 during a docking event 91. The operation of dockable computer system 10 is described below with reference to FIGS. 1–4.

Docking event 91 begins when dockable computer system 10 is in the undocked state preparatory to the docked state. When dockable computer system 10 is in this state, microswitch 82 (FIG. 3) is actuated and docking station 22 sends a CONNECT message to portable computer 20 as shown in a block 92 (FIG. 4). Alternatively, microcontroller 38 can initiate the transmission of the CONNECT message in response to a timing signal provided at clock input 84. A timer (not shown) can be configured to provide the timing signal at clock input 84 periodically, such as once every second or other convenient period.

When microcontroller 38 receives the signal at input 81, microcontroller 38 programs UART 86 so that the CONNECT message is transmitted by infrared transmitter 89 across communication link 50 to portable computer 20. The CONNECT message represents a predetermined sequence of pulses which indicates that a docking event is imminent. The CONNECT message is preferably provided at a baud rate of 1,000, 1,400, 1,600, 1,800, 2,000, or other non-standard PC/AT baud rate to avoid noise from other infrared transmitters which can be present in this environment.

When infrared receiver 62 (FIG. 2) in portable computer 20 receives the CONNECT message, decoder 64 provides the predetermined sequence of pulses associated with 'the CONNECT message to connect detect logic circuit 70. Connect detect logic circuit 70 preferably provides a connect signal to PMU 55 in response to the predetermined sequence. Connect detect logic circuit 70 is preferably a register and a decoder, or a programmable device capable of providing the connect signal in response to the predetermined sequence. UART 68 preferably ignores the CONNECT message because the CONNECT message is provided at a non-standard PC/AT baud rate.

PMU 55 preferably provides a system management interrupt (SMI) in response to the CONNECT signal. A SMI is a non-maskable, very high priority interrupt. Preferably, CPU 26 initiates a system management interrupt (SMI) subroutine in response to receiving the SMI from PMU 55. The logic circuit 70 can be programmed or configured to provide the connect signal in response to a particular predetermined sequence indicative of a particular docking station 22. In this way, only an appropriate portable computer 20 for the particular docking station 22 is interrupted by the CONNECT message.

FIG. 5 is a flow chart of the SMI service routine. CPU 26 (FIG. 2) receives the SMI from PMU 55, ceases normal operation, and begins the SMI service routine as shown in a block 100 (FIG. 5). The SMI advantageously utilizes PMU 55 and interrupt inputs (not shown) of CPU 26 so the impending docking event is given immediate attention by CPU 26. The SMI service routine identifies the impending dock as the cause of the SMI.

CPU 26 programs UART 68 to the known communication frequency so that a CONNECT DETECTED message is transmitted by infrared transmitter 60 as shown in a block 110 (FIG. 5). After UART 68 is programmed, CPU 26 waits to receive a CONFIRM message from docking station 22 as shown in a block 120.

With reference to FIG. 4, portable computer 20 sends the CONNECT DETECTED message as shown in a block 93. More particularly, UART 68 (FIG. 2) provides the CONNECT DETECTED message to encoder 66. Encoder 66 encodes and provides the CONNECT DETECTED message to infrared transmitter 60 which transmits the CONNECT DETECTED message across communication link 50. The CONNECT DETECTED message can include information about the identification of portable computer 20, its principal user, or hardware and software associated with it.

Infrared receiver 73 (FIG. 3) receives the CONNECT DETECTED message from portable computer 20. UART 86 provides the CONNECT DETECTED message to microcontroller 38. Microcontroller 81 programs UART 86 to provide a CONFIRM message to portable computer 20 in response to the CONNECT DETECTED message. Transmitter 89 transmits the CONFIRM message to portable computer 20 across communication link 50 as shown in a block 94 (FIG. 4). The CONFIRM message can include information about the identification of docking station 22, its principal user, or hardware and software associated with it. Alternatively, the CONNECT message can provide such information, or such information can be exchanged in other messages communicated after the CONFIRM message.

As part of the SMI service routine, portable computer 20 generates the advance notice signal or warning as an alert of the impending dock, as indicated at block 130 (FIG. 5), in response to the CONFIRM message. The advance notice signal provides warning of the impending docking event to components within portable computer 20 and particularly to CPU 26. After the advance notice signal is generated, portable computer 20 exits the SMI service routine as indicated at block 140. Alternatively, the advance warning signal could be generated by a logic circuit, software, or other device in response to the CONFIRM message.

After portable computer 20 returns from the SMI routine as shown in a block 140 (FIG. 5), dockable computer system 10 reaches the docked state as shown in a block 96 (FIG. 4) when system bus 24 and docking bus 46 are capable of physical electrical communication.

The use of the protocol of a CONNECT message, CONNECT DETECTED message, and CONFIRM message provides an advantageous protocol which is not susceptible to generating advance notice signals when an impending dock is not present. The advantageous protocol which preferably requires the transmission and reception of three messages is less susceptible to spurious infrared signals generated by dockable computer system 10 or other infrared sources (not shown). Thus, the exemplified protocol ensures that only a genuine impending dock causes an advance notice signal to be generated.

Communication link 50 also advantageously allows data to be communicated between system bus 24 and station bus 46 before external connector 34 and external connector 36 are physically coupled. For example, communication link 50 allows system parameters to be communicated between portable computer 20 and docking station 22 before dockable computer system 10 achieves the docked state. Such parameters include the bus speeds of system bus 24 and docking bus 46, the voltage interface between external connector 34 and external connector 36, as well as the advance notice signal. The transfer of such parameters between portable computer 20 and docking station 22 prevents catastrophic bus and component malfunction due to unexpected bus parameters. Further, other parameters such as identification for docking station 22, location of docking station 22, or the number and types of peripherals within portable computer 20 and docking station 22, can be advantageously transmitted before dockable computer system 10 reaches the docked state.

Communication link 50 can also be advantageously utilized when portable computer 20 is undocked from docking station 22. For example, portable computer 20 can advantageously transmit and receive parameters via link 50 as portable computer 20 is removed from station 22. Such parameters can relate to the geographic location of portable computer 20, the upcoming mobile computer task, a notice signal or warning of the impending docking event (undocking), or configuration information. Communication link 50 allows the parameters to be communicated even though buses 24 and 46 are in the process of ceasing physical, electrical communication. This aspect of the present invention is particularly advantageous in a VCR-style ejection mechanism (not shown) for system 10 in which portable computer 20 can communicate to docking station 22 across link 50 as portable computer 20 is ejected from docking station 22, even though buses 24 and 46 are not physically coupled. Communication link 50 can be also utilized as an extra data channel when external connector 34 and external connector 36 are physically coupled.

Communication circuits 32 and 44 preferably provide communication link 50 such as an infrared communication link. Preferably, communication circuits 32 and 44 are similar to HPSIR two-way wireless communication ports as defined by Infra-Red Development Association (IRDA). Although communication link 50 is preferably an infrared communication link, a long pin interface, a radio frequency link, a sonic link, a light wave link, a passive RF communication link, a bar code reader, or any wireless communication link can be utilized.

Those communication systems which operate in a line of sight mode are most readily adapted to single pair systems comprised of a specifically associated mobile and stationary unit. Because line of sight places both units in an operative configuration preparatory to docking, there is little opportunity for random or unwanted communication while the two are pointed toward each other. In another variant of the present invention, the system allows reliable identifiable pairings of mobile and host units when many combinations are possible. For example, it is commonplace in many engineering offices for each engineer to have a dedicated desktop computer, where the individual workstations are relatively close to one another or at least one finds several in the same room. It is advantageous to provide docking capabilities for each and to be able to distinguish specific or desirable docking configurations from others.

The present docking system communication link accommodates the needs of these users. For example, the communication system can be programmed to "squawk" an identification code preparatory to docking to enable an appropriate host to be configured to receive the remote unit or to disable a host unit inappropriate for docking with the remote unit. Alternatively, the communication system can provide infrared messages indicative of the identification code. In yet another embodiment, the communication system of each mobile and stationary unit can transmit a specific frequency, pattern, addressing methodology or wave signature in accordance with the particular mobile and stationary unit. Such communication systems can be advantageously utilized to protect mobile and stationary units which store confidential information, which have different bus interfaces, which have access to sensitive resources, or which should be isolated from other units for various reasons. Further, the communication of identification information ensures that only the appropriate mobile and stationary units are interrupted and begin preparation for the impending docking events. Such identification information can identify the mobile unit by a specific identification number given to its microprocessor, stored in a dip switch, or integrated within components in the mobile unit.

Figure 6:
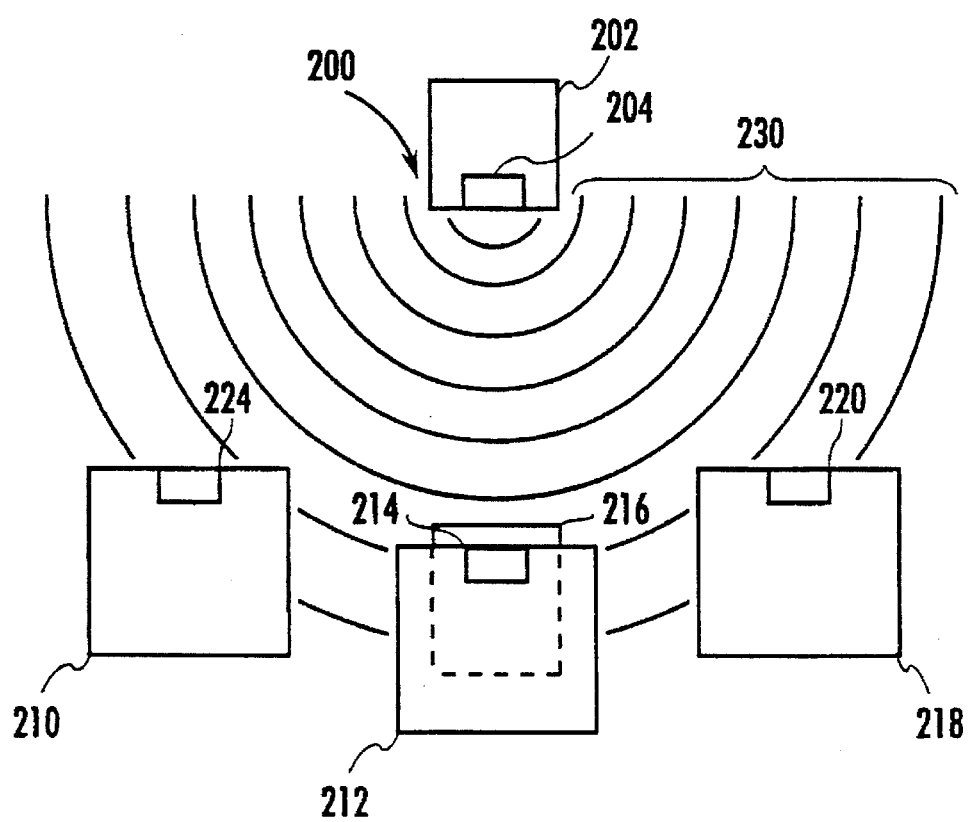
FIG. 6 is a block diagram of a portable computer transmitting a CONNECT MESSAGE to several docking stations in accordance with a further aspect of the present invention.

FIG. 6 schematically illustrates a room 200 including a docking station 210, a docking station 212 and a docking station 218. A portable computer 216 is docked with docking station 212, and a portable computer 202 is preparing to be docked. Docking station 210 includes a communication circuit 224, docking station 212 includes a communication circuit 214 and docking station 218 includes a communication circuit 220. Portable computer 202 includes a communication circuit 204. Communication circuits 204, 212, 214 and 220 contain an RF transmitter and an RF receiver for two-way RF communication. Alternatively, circuits 204, 212, 214 and 220 are wireless communication circuits such as audio communication circuits, ultrasonic communication circuits, infrared communication circuits or, other electromagnetic communication circuits.

Communication circuit 204 of portable computer 202 preferably transmits a CONNECT message 230 to docking stations 210, 212 and 218 located in room 200. The CONNECT message 230 is preferably communicated over an electromagnetic wave which propagates throughout room 200. The electromagnetic wave preferably has a carrier frequency up to 2 GHz. Preferably, the CONNECT message is a frequency modulated signal having a carrier frequency of $10^6$ hertz. Alternatively, a frequency spectrum may be utilized as assigned by a federal agency (FCC). Such a spectrum may be part of the 1–2 GHz range reserved for personal communication services (PCS). Information can be conveyed by CONNECT message 230 as the frequency is varied from the carrier frequency.

Preferably, portable computer 202 initiates the transmission of the CONNECT message 230 when the portable computer 202 is in an undocked state preparatory to the docked state. The CONNECT message can advantageously provide identification information about portable computer 202 by its frequency, pattern, addressing methodology, or wave signature.

The CONNECT message can also identify the particular docking station 210, 212 or 218 with which portable computer 202 should be docked. Such information can advantageously expedite the docking process. For example, if the CONNECT message indicates portable computer 202 should be docked with docking station 212, station 212 can automatically undock portable computer 216 in order to prepare for the upcoming docking event with portable computer 202. Also, such identification information ensures that only the selected docking station 210, 211, or 218 is interrupted.

After receiving CONNECT message 230, docking stations 210, 212 or 218 can be prepared for docking. Alternatively, each docking station 210, 212 and 218 can respond to the CONNECT message by transmitting information about itself. Portable computer 202 can then select the most appropriate docking station 210, 212 or 218 in response to this information. Alternatively, portable computer 20 and select docking station 210, 212, or 218 may utilize the advantageous protocol discussed with reference to FIGS. 4 and 5.

It is understood that, while the detailed drawings and specific examples given describe a preferred exemplary embodiment of the present invention, they are for the purpose of illustration only. The apparatus of the invention is not limited to the precise details and conditions disclosed. For example, although the docking station initiates the CONNECT message, the dockable computer system could be arranged so that the portable computer initiates the CONNECT message. Also, although the system bus is shown, a sub-bus or secondary bus could be utilized. Further, the system can be utilized with a personal digital assistant (PDA) or other mobile computing unit. Further still, single lines in the various signals can represent multiple conductors. Various changes can be made to the details disclosed without departing from the spirit of the invention which is defined by the following claims.

We claim:

1. A dockable computer system including a host station and a mobile computer unit wherein said host station includes a station bus, and said mobile computer unit includes a unit bus, a unit processor and unit memory, wherein said mobile computer unit resides in at least two distinct states, a docked state in which said unit is operatively associated and physically communicating with said station and an undocked state in which said unit is physically separate from said station, and further wherein said mobile computer unit is in electromagnetic communication with said host station when said system is in said undocked state preparatory to assuming said docked state to transmit information via a wireless communication link between said unit and said station to prepare the dockable computer system for docking while said unit is, physically separate and physically proximate said station said information including pro-dock configuration information, said predock configuration information including bus speed information and identification information.

2. The dockable computer system of claim 1 wherein said electromagnetic communication is infrared communication, and said prodock communication information includes peripheral device information.

3. The dockable computer system of claim 1 wherein said electromagnetic communication is radio frequency communication, and said predock communication information includes peripheral device information.

4. The dockable computer system of claim 1 wherein said electromagnetic communication is optical communication, and said predock communication information includes peripheral device information.

5. The dockable computer system of claim 1 wherein said host station enables said electromagnetic communication in response to said dockable computer system being in said undocked state prior to assuming said docked state.

6. A method of communicating docking parameters and data between a portable computer and a host station in a dockable computer system, said portable computer having a bus and said host station having a bus, said dockable computer system assumes a docked state and an undocked state, said bus of such host station being in physical electrical communication with said bus of said portable computer when said dockable computer system is in said docked state, said method comprising the steps of:

electromagnetically communicating said docking parameters via a wireless communication link to prepare the dockable computer system for docking between said portable computer and said docking station when said dockable computer system is in said undocked state preparatory to said docked state, said docking parameters being communicated while said portable computer is physically separate from said host station, said docking parameters including identification information and bus speed information; and electrically communicating said data between said bus of said portable computer and said bus of said host station when said dockable computer system is in said docked state.

7. The method of claim 6 wherein said step of electromagnetically communicating said data docking parameters includes electromagnetically communicating said data docking parameters in the infrared spectrum, and said docking parameters include peripheral device information.

8. The method of claim 6 wherein said step of electromagnetically communicating said data docking parameters includes electromagnetically communicating said data docking parameters in the radio frequency spectrum, and said docking parameters include peripheral device information.

9. The method of claim 6 wherein said step of electromagnetically communicating said data docking parameters includes electromagnetically communicating said data docking parameters in the visible light spectrum, and said docking parameters include peripheral device information.

10. A portable computer for use with a host station including a bus, said portable computer operable as a stand-alone computer or as an integrated computer system with said host station, said portable computer comprising:

a CPU;

a portable bus in physical electrical communication with said CPU, said portable bus being in physical electrical communication with said bus of said host station when said portable computer is operated as said integrated computer system; and a communication system providing a wireless communication link for communicating messages to prepare the portable computer for docking as said integrated computer between said CPU and said host station prior to said portable computer changing from being operated as a stand-alone computer to being operated as said integrated computer system, said messages including a dock warning being and a predock configuration message, said messages being communicated while said portable computer is physically separate from said host station, said predock configuration message including bus speed and identification information.

11. The portable computer of claim 10 wherein said communication link is an electromagnetic communication link, and the predock configuration message includes peripheral device information about the portable computer.

12. The portable computer of claim 10 wherein said communication system is an audio communication link, and the predock configuration message includes peripheral device information about the portable computer.

13. The portable computer of claim 11 wherein said communication link is an infrared communication link, and the predock configuration message includes peripheral device information about the portable computer.

14. A dockable computer system assumes a docked state and an undocked state, said dockable computer system comprising:

a mobile computer having a bus; and a host station having a bus, said bus of said host station being in physical electrical communication with said bus of said mobile computer when said dockable computer system is in said docked state, and said mobile computer being in electromagnetic communication via a wireless communication link with host station to prepare the dockable computer system for docking when said dockable computer system is in said undocked state preparatory to said docked state, said dockable computer system communicating predock configuration information via the wireless communication link when said dockable computer system is in an undocked state preparatory to said dock state, said prodock configuration information including bus speed information and identification information.

15. In a dockable computer system comprised of a host computer station, including a station bus, and a mobile computer unit including a unit bus, a unit processor and unit memory, wherein said system resides in at least two distinct states, a docked state in which said unit is operatively associated in physical communication with said station and an undocked state in which said unit is physically separate from said station, the improvement comprising a transmitter in at least one of said station or said unit programmable to send signals via a wireless communication link related to a connect message and a predock configuration message to prepare the dockable computer system for docking and a receiver in at least one of said unit or said station programmable to receive said connect message and said predock configuration message, said connect message and said predock message being sent while said host computer station is physically separate from said mobile computer unit, said predock configuration message indicating bus speed information and identification information.

16. The dockable computer system of claim 15 wherein said transmitter sends said connect message and prodock configuration message across an infrared communication link.

17. The dockable computer system of claim 15 wherein said transmitter and said receiver are both located on either said mobile computer unit or said station.

18. A method of providing configuration information and a notice signal in a dockable computer system including a station unit and a mobile computer unit, said mobile computer unit changing from being a stand-alone computer to being an integrated computer system in response to a docking event, said station unit and mobile computer unit being in communication across a wireless communication link while physically separate, said notice signal warning of said docking event, said method comprising:

providing a connect message between said units across said wireless communication link before said mobile computer unit is operable as an integrated computer system, said connect message including said configuration information, said configuration information including bus speed and identification information;

providing a connect detected message between said units across said wireless communication link in response to said connect message;

providing a connect detect confirm signal across said wireless communication link between said units in response to said connect detected signal; and providing said notice signal in response to said connect detect confirm signal.

19. The method of claim 18 wherein said connect message is provided at a non-standard Baud rate.

20. A method of providing configuration information and a notice signal in a dockable computer system including a portable computer and a host station, said system residing in at least two distinct states, a docked state in which said unit is operatively associated and physically communicating with said station and an undocked state in which said portable computer ie physically separate from said station, said system changing from said undocked state to said docked state in response to a docking event, portable computer and said host station communicating across a wireless communication link, said notice signal warning of said docking event, said method comprising:

providing a connect message across said wireless communication link from said host station to said portable computer when said system is in said undocked state, said connect including said configuration information, said configuration information including bus speed and identification information, receiving said connect message and generating a connect signal in said portable computer;

performing an interrupt subroutine in said portable computer in response to said connect signals; and providing said notice signal after said interrupt subroutine is initiated.

21. The method of claim 20 wherein said connect message is provided at a non-standard Baud rate.

22. The method of claim 20 wherein said interrupt subroutine generates said notice signal.

23. The method of claim 20 wherein said connect message is provided when said system is in said undocked state preparatory to said docked state, and said connect message includes predock configuration information.

\* \* \* \* \*